(12) United States Patent  (10) Patent No.: US 6,749,028 B1
Chan et al.                (45) Date of Patent:    Jun. 15, 2004

(54) POWER TOOL TRIGGER ASSEMBLY

(75) Inventors: Kai Chi Chan, Chaiwan (HK); Man Ting Ho, Chaiwan (HK)

(73) Assignee: Defond Components Limited, Chaiwan (HK)

( * ) Notice: Subject to any disclaimer, the term of this patent is extended or adjusted under 35 U.S.C. 154(b) by 0 days.

(21) Appl. No.: 10/442,964

(22) Filed: May 22, 2003

(51) Int. Cl.[7] .............................................. B25B 23/00
(52) U.S. Cl. ...................... 173/170; 310/50; 200/1 V; 200/16 B; 200/157; 173/217
(58) Field of Search ........................... 173/170, 2, 171, 173/217; 200/6 R, 16 B, 16 R, 522, 1 V, 244, 157, 509; 310/47, 50

(56) References Cited

U.S. PATENT DOCUMENTS

| | | | | |
|---|---|---|---|---|
| 3,260,827 A | * | 7/1966 | Frenzel | 200/522 |
| 3,467,801 A | * | 9/1969 | Matthews | 200/1 V |
| 3,632,936 A | * | 1/1972 | Piber | 200/1 V |
| 4,493,377 A | * | 1/1985 | Gunther et al. | 173/170 |
| 4,597,453 A | * | 7/1986 | Kilmer et al. | 173/171 |
| 5,918,685 A | * | 7/1999 | Ulbrich et al. | 173/4 |

* cited by examiner

*Primary Examiner*—Scott A. Smith
(74) *Attorney, Agent, or Firm*—Leydig, Voit & Mayer, Ltd.

(57) ABSTRACT

A trigger assembly for controlling an electric power tool including a motor comprises a base for fixing within the power tool and a trigger supported by the base for inward and outward movement, the trigger being resiliently biassed outwards. The base has a housing including an opening open to the interior of the power tool. A switch provided in the housing is operable in response to the movement of the trigger to switch on and off the motor. An electronic operating circuitry provided in the housing includes a solid-state device for switching at a frequency having a variable duty cycle to control the operation of the motor when the switch is closed. Also included is a flywheel diode for the motor, which is operable when the solid-state device is non-conducting while switching. The diode is supported at or adjacent the housing opening to facilitate heat dissipation.

13 Claims, 5 Drawing Sheets

POWER TOOL TRIGGER ASSEMBLY

BACKGROUND OF THE INVENTION

The operation of electric hand drills is typically controlled by means of a pull-trigger for switching on and off the motor as well as to adjust its speed/torque. The trigger incorporates an electronic operating circuitry that includes a solid-state device for switching at a variable duty cycle to control the speed/torque of the motor. While the solid-state device is non-conducting during switching, a flywheel diode allows the motor current to continue to flow. For heat dissipation, the diode is invariably located at a position away from the trigger and is connected thereto by cables, which renders the assembling process complicate.

The invention seeks to mitigate or at least alleviate such a problem by providing an improved trigger assembly.

SUMMARY OF THE INVENTION

According to the invention, there is provided a trigger assembly for controlling the operation of an electric power tool including an electric motor, comprising a base for fixing within the power tool and a trigger supported by the base for inward and outward movement, the trigger being resiliently biased outwards. The base has a housing including an opening open to the interior of the power tool. A switch provided in the base housing is operable in response to the movement of the trigger to switch on and off the motor. An electronic operating circuitry provided in the base housing includes a solid-state device for switching at a frequency having a variable duty cycle to control the operation of the motor when the switch is closed. Also included is a flywheel diode for the motor, which is operable when the solid-state device is non-conducting while switching. The diode is supported at or adjacent the base housing opening to facilitate heat dissipation.

Preferably, the flywheel diode protrudes at least partially out of the base housing opening.

It is preferred that the flywheel diode has a body protruding partially out of the base housing opening and a pair of terminals substantially within the base housing opening.

It is further preferred that the body of the flywheel diode has an oblong shape having an axis and opposite ends from which the terminals extend, the axis lying substantially parallel to the base housing opening.

Preferably, the flywheel diode has an oblong body having an axis and opposite ends and a pair of terminals extending from the body ends respectively, the axis lying substantially parallel to the base housing opening.

Preferably, the base housing opening is substantially flat.

In a preferred embodiment, the flywheel diode has a pair of terminals, and two rigid conductors in the base housing locate the flywheel diode by its terminals.

More preferably, at least one of the terminals is press-fitted to and thus connected with the corresponding conductor.

Further more preferably, the corresponding conductor has a recess of a width marginally smaller than a cross-sectional dimension of said at least one terminal, such that the terminal can be laterally press-fitted into the recess and thus connected with the conductor.

Further more preferably, the recess comprises a cutout having an opening of said width.

It is further preferred that said at least one conductor generally extends at right angles to the base housing opening, and the recess opens in a direction transversely to the general extent of the conductor.

The invention also provides an electric power tool including an electric motor and the aforesaid trigger assembly.

In one example, the electric power tool is an electric hand drill.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
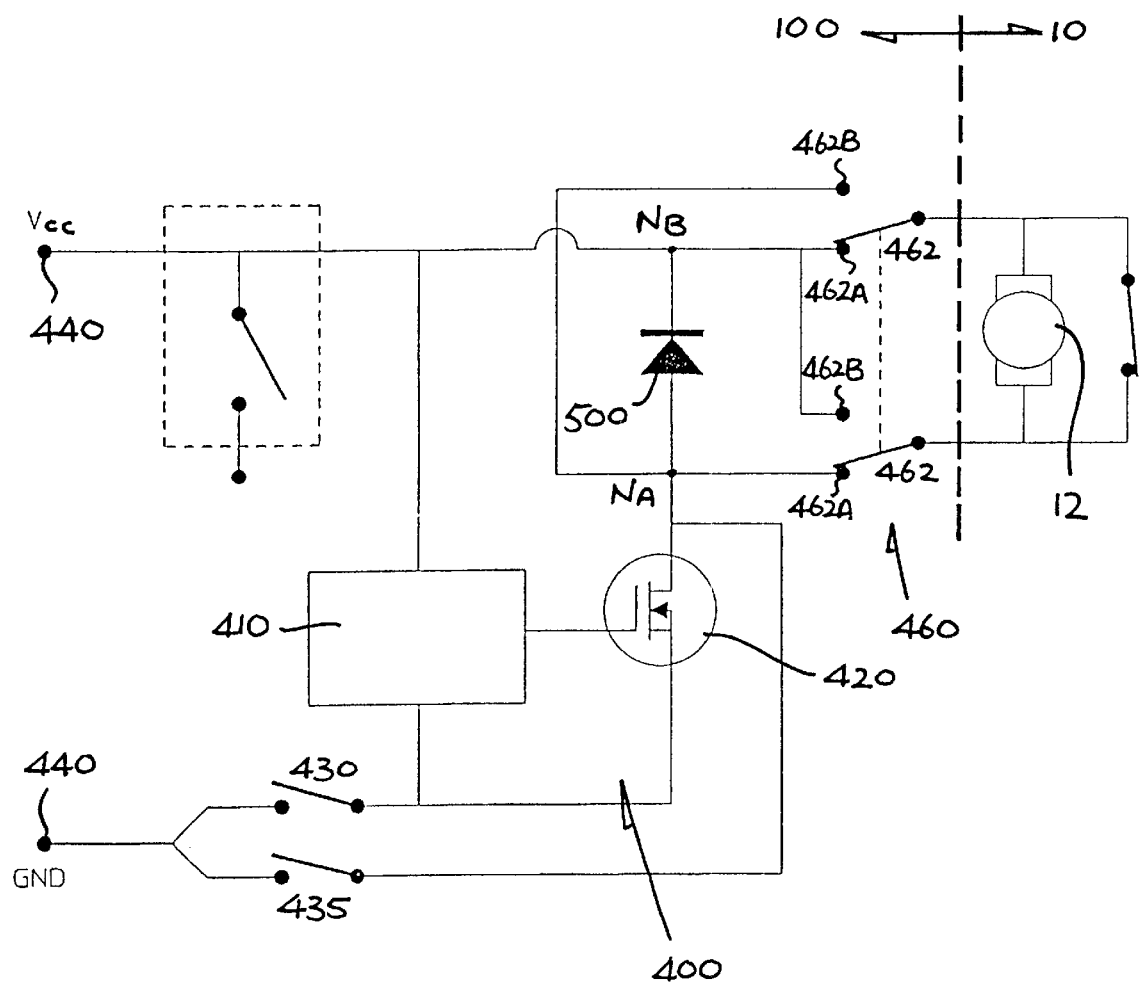
FIG. 1 is a simplified circuit diagram of an embodiment of a trigger assembly in accordance with the invention, connected to an electric power tool incorporating a motor, said assembly including a flywheel diode for the motor.
Figure 2:
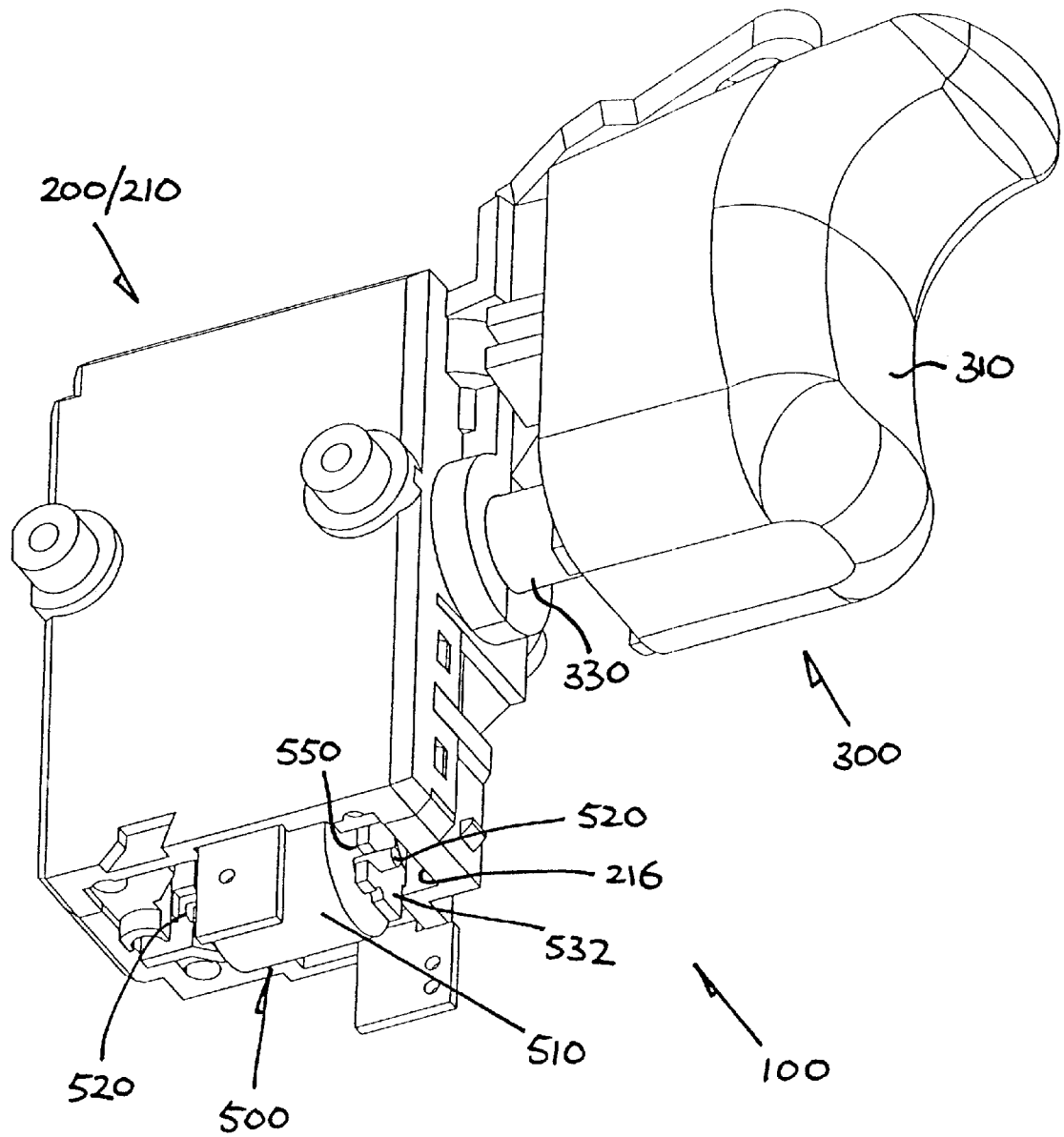
FIG. 2 is a bottom perspective view of the trigger assembly of FIG. 1, showing the flywheel diode.
Figure 3:
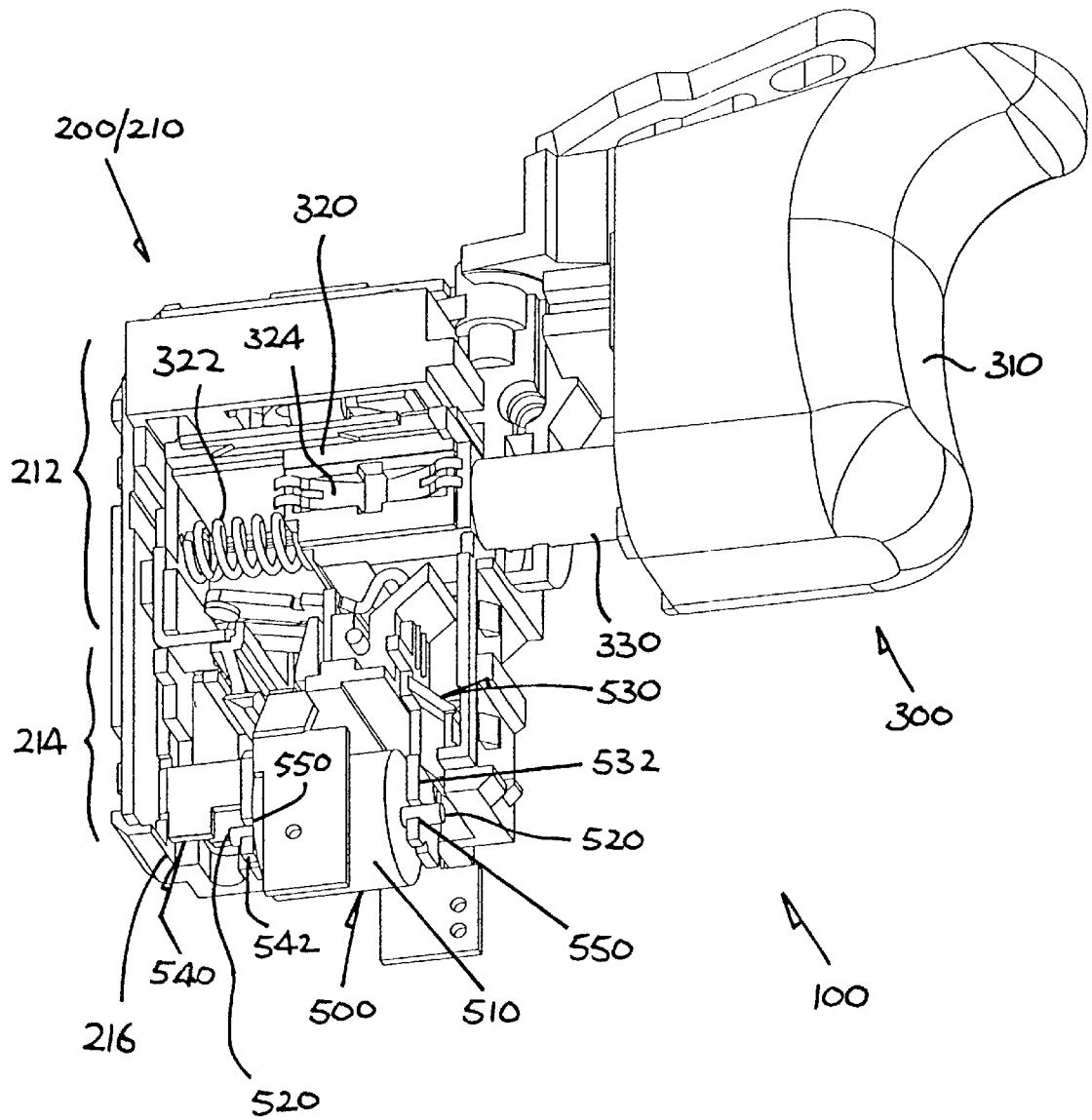
FIG. 3 is a bottom perspective view corresponding to FIG. 2, with a side wall of the trigger assembly removed to show more of the flywheel diode.

Referring to the drawings, there is shown a trigger assembly 100 embodying the invention for controlling the operation of an electric power tool such as a hand drill 10 that incorporates an electric motor 12. The trigger assembly 100 comprises an upright generally rectangular base 200 fixed inside the drill body adjacent the upper end of its handgrip and a pull-trigger 300 supported by the base 200 for inward (rearward) and outward (forward) horizontal sliding movement. A housing 210 of the base 200 has an upper portion 212 from inside which the pull-trigger 300 extends forwards, and a lower portion 214. The lower portion 214 includes a generally flat rectangular bottom opening 216 open to the interior of the hand drill 10 externally of the base housing 210, partially within which opening 216 a flywheel diode 500 for the motor 12 is located.

The trigger assembly 100 incorporates, as contained within its base housing 210, an electronic operating circuitry 400 which comprises an IC control circuit 410 and a solid-state switch 420 controlled by the circuit 410. A mechanical main switch 430 operated by the pull-trigger 300 is also contained within the housing 210. These two switches 420 and 430 are connected in series with the motor 12 across positive (Vcc) and negative (GND) terminals 440 of a rechargeable DC battery pack for the hand drill 10. Another mechanical, bypass switch 435, also operated by the pull-trigger 300, is connected in parallel with the main and solid-state switches 430 and 420 for bypassing them. The flywheel diode 500 and a double-pole double-throw reversal switch 460 are connected across the terminals of the motor 12. The flywheel diode 500 is connected to the motor 12 by the reversal switch 460 only when the reversal switch 460 switches the motor 12 to run in the forward direction.

In use, the main switch 430 switches on the motor 12 upon (or shortly after) pulling back of the pull-trigger 300 and later switches it off when the pull-trigger 300 returns to its initial foremost (outermost) home position. While the main switch 430 is closed, the solid-state switch 420 controls the operation of the motor 12. The control circuit 410 comes into operation upon closing of the main switch 430, whereupon it triggers the solid-state switch 420 at a relatively high frequency having a variable duty cycle according to the travelling position of the pull-trigger 300 for adjusting the speed/torque of the motor 12. The flywheel diode 500 allows the motor current to continue to flow while the solid-state switch 420 is non-conducting.

The bypass switch 435 is connected from the negative (GND) battery terminal 440 to a circuit node NA beyond the solid-state switch 420. The bypass switch 435 will be closed when the trigger body 310 is (almost) fully pulled back for bypassing the solid-state switch 420, thereby delivering full power directly to the motor 12 for maximum speed/torque operation.

The pull-trigger 300 has a body 310 exposed for manual pulling, a generally rectangular core slider 320 guided within the upper portion 212 of the base housing 210 for back and forth sliding movement, and a horizontal shaft 330 interconnecting the trigger body 310 and slider 320 for simultaneous movement. The core slider 320, which is resiliently biassed forwards from behind by a compression coil spring 322, carries on its right side a four-pronged sliding contact 324. The contact 324 bears slidably against a row of contact strips on a circuit board mounting the control circuit 410 for selectively making contact therewith, as the slider 320 is pushed inwards by the trigger body 310 or outwards by the spring 322 upon release of the trigger body 310. The sliding position of the contact 324 determines the duty cycle of the trigger signal generated by the control circuit 410 for switching on and off the solid-state switch 420.

The reversal switch 460 is effectively a pair of switches 462 connected to opposite terminals of the motor 12, each switch 462 having first and second terminals 462A and 462B. The pair of first terminals 462A represents the positive (Vcc) and negative (GND) battery terminals 440 in one polarity, whereas the pair of second terminals 462B represents the same in the reverse polarity. The motor 12 is normally connected to the first terminals 462A for running in the forward direction, and may be switched as desired to the second terminals 462B for running backwards. The two first terminals 462A of the reversal switch 460 lead to circuit nodes $N_A$ and $N_B$, across which the flywheel diode 500 is connected in a direction with its anode to the former node $N_A$ and its cathode to the latter node $N_B$. The node $N_B$ is connected to the positive (Vcc) battery terminal 440.

While being connected by the reversal switch 460, the flywheel diode 500 will automatically come into operation whenever the solid-state switch 420 is non-conducting during switching. Given that the flywheel diode 500 is required to handle the motor current that can surge up to several tens of amperes, the diode temperature can rise up to over 100° C. To facilitate heat dissipation out of the base housing 210, the diode 500 is located at or adjacent the housing opening 216.

The flywheel diode 500 has an oblong cylindrical body 510 having opposite ends and a central axis, and includes a pair of wire terminals 520 extending co-axially from respective body ends. Two rigid conductors 530 and 540 in the base housing 210 locate the diode 500 by holding its respective terminals 520, hence in electrical connection therewith. The conductors 530 and 540 have lower ends 532 and 542 fixing the corresponding diode terminals 520 and include upper ends 534 and 544 connected to respective circuit nodes $N_B$ and $N_A$.

Figure 4:
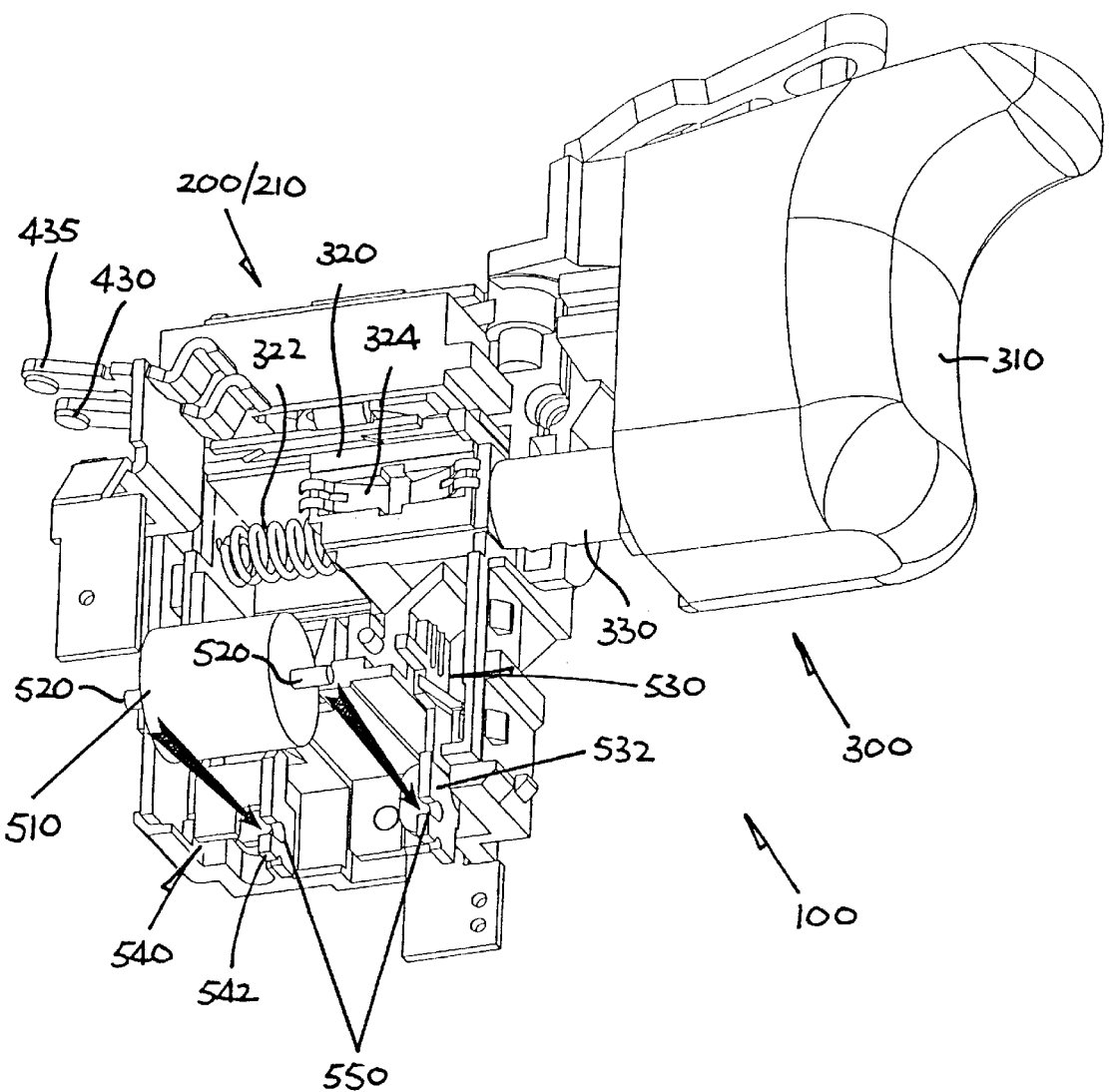
FIG. 4 is a bottom perspective view corresponding to FIG. 3, showing how the flywheel diode is mounted.
Figure 5:
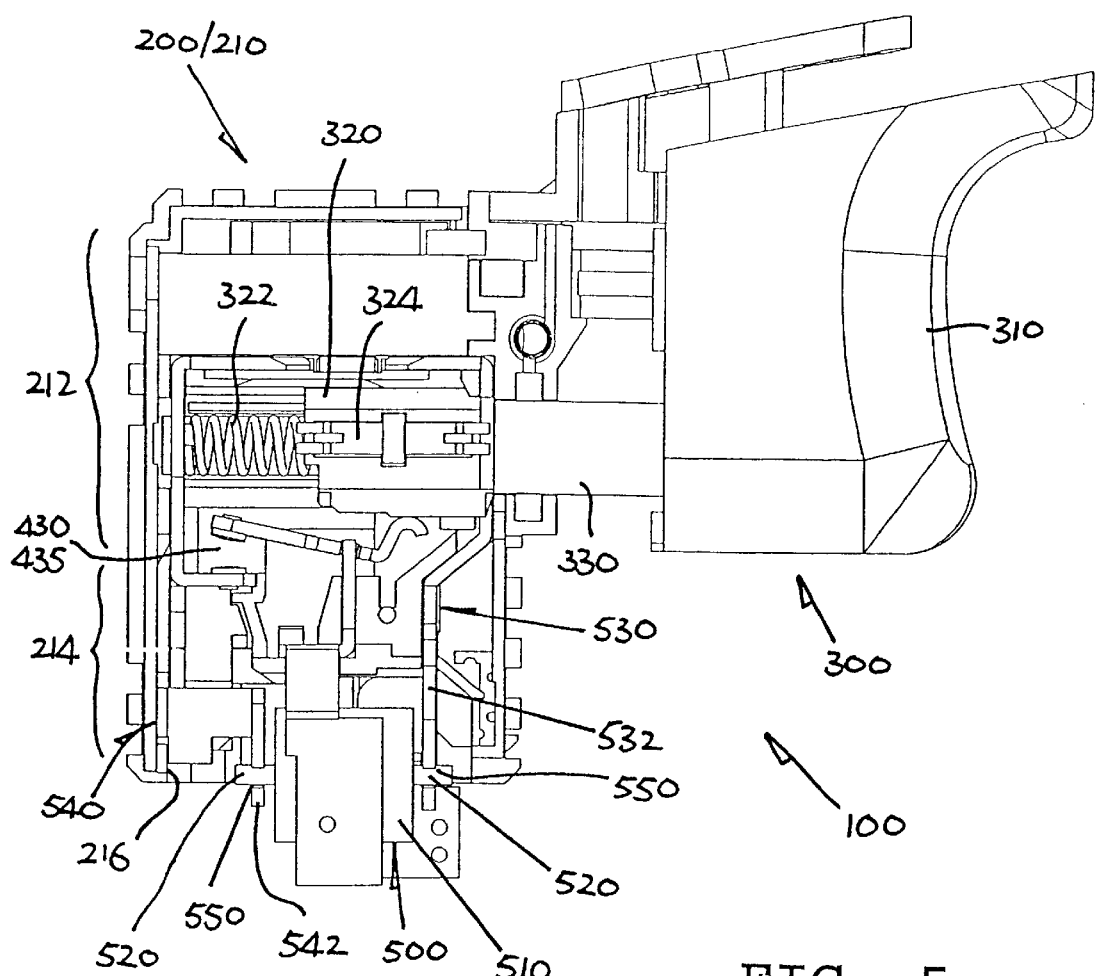
FIG. 5 is a right side view of the trigger assembly of FIG. 3.
Figure 6:
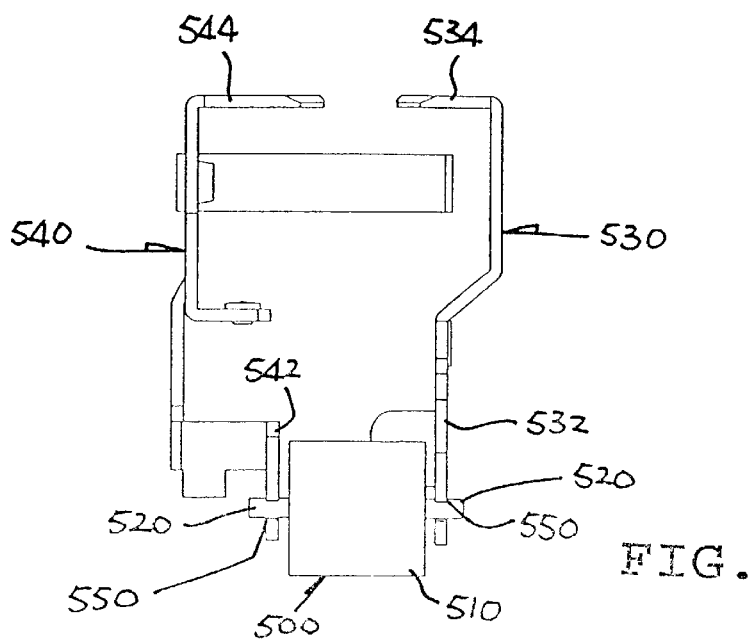
FIG. 6 is a right side view of the flywheel diode and its associated connection taken out from the trigger assembly of FIG. 3.

The two lower conductor ends 532 and 542 extend at right angles slightly out of the base housing opening 216 through opposite ends thereof in like manner, and include respective mutually aligned recesses or cutouts 550 for engaging the corresponding diode terminals 520 as a press-fit for quick connection. The cutouts 550 open in a direction transversely of the conductor ends 532 and 542, on the same side thereof. Each cutout 550 has a slightly restricted opening of a width marginally smaller than the diameter of the corresponding diode terminal 520, such that the terminal 520 can be laterally press-fitted into the cutout 550 (FIG. 4) and thus connected with the conductor 532/542, which is quick and convenient.

While installed, the flywheel diode 500 has its body 510 protruding partially (about half) out of the base housing opening 216 and its terminals 520 substantially wholly within the opening 216. More specifically, the axis of the diode body 510 lies parallel to the plane of the housing opening 216. This arrangement minimises the risk of accidental dislocation of the diode 500, as the connection between the diode 500 and the conductors 530 and 540 is contained substantially within the base housing 210 and is effected in a lateral direction at right angles to the passage through its opening 216.

It is envisaged, however, that in order to maximise heat dissipation, the flywheel diode 500 may be located outside the base housing 210 adjacent its opening 216, with the rigid conductors 530 and 540 protruding out through the opening 216 for connecting the diode 500 in the same quick manner.

The detailed construction and operation of other parts of the trigger assembly 100 are described in two related utility patent applications entitled "Power Tool Trigger Assembly" filed on the same day in the name of the same inventors under Ser. Nos. 10/442,965 and 10/443,060, the disclosures thereof being hereby incorporated by reference.

The subject trigger assembly may be utilized to control any other types of electric power tools, such as a reamer, cutter or saw.

The invention has been given by way of example only, and various other modifications of and/or alterations to the described embodiment may be made by persons skilled in the art without departing from the scope of the invention as specified in the appended claims.

What is claimed is:

1. A trigger assembly for controlling the operation of an electric power tool including an electric motor, comprising:
    a base for fixing within said power tool, the base having a housing including an opening open to the interior of said power tool;
    a trigger supported by the base for inward and outward movement, the trigger being resiliently biassed outwards;
    a switch provided in the base housing and operable in response to the movement of the trigger to switch on and off said motor;
    an electronic operating circuitry provided in the base housing including a solid-state device for switching at a frequency having a variable duty cycle to control the operation of said motor when the switch is closed; and
    a flywheel diode for said motor operable when the solid-state device is non-conducting while switching, the diode being supported at or adjacent the base housing opening to facilitate heat dissipation.

2. The trigger assembly as claimed in claim 1, wherein the flywheel diode protrudes at least partially out of the base housing opening.

3. The trigger assembly as claimed in claim 1, wherein the flywheel diode has a body protruding partially out of the base housing opening and a pair of terminals substantially within the base housing opening.

4. The trigger assembly as claimed in claim 3, wherein the body of the flywheel diode has an oblong shape having an axis and opposite ends from which the terminals extend, the axis lying substantially parallel to the base housing opening.

5. The trigger assembly as claimed in claim 1, wherein the flywheel diode has an oblong body having an axis and opposite ends and a pair of terminals extending from the body ends respectively, the axis lying substantially parallel to the base housing opening.

6. The trigger assembly as claimed in claim 1, wherein the base housing opening is substantially flat.

7. The trigger assembly as claimed in claim 1, wherein the flywheel diode has a pair of terminals, and two rigid conductors in the base housing locate the flywheel diode by its terminals.

8. The trigger assembly as claimed in claim 7, wherein at least one of the terminals is press-fitted to and thus connected with the corresponding conductor.

9. The trigger assembly as claimed in claim 8, wherein the corresponding conductor has a recess of a width marginally smaller than a cross-sectional dimension of said at least one terminal, such that the terminal can be laterally press-fitted into the recess and thus connected with the conductor.

10. The trigger assembly as claimed in claim 9, wherein the recess comprises a cutout having an opening of said width.

11. The trigger assembly as claimed in claim 9, wherein said at least one conductor generally extends at right angles to the base housing opening, and the recess opens in a direction transversely to the general extent of the conductor.

12. An electric power tool including an electric motor and the trigger assembly as claimed in claim 1.

13. The electric power tool as claimed in claim 12, being an electric hand drill.

\* \* \* \* \*